(12) United States Patent
Nethery

(10) Patent No.: US 11,475,108 B2
(45) Date of Patent: *Oct. 18, 2022

(54) SECURE HARDWARE BACKDOOR FOR DIGITAL DEVICES

(71) Applicant: Stanton Kee Nethery, Sebastopol, CA (US)

(72) Inventor: Stanton Kee Nethery, Sebastopol, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 16/856,027

(22) Filed: Apr. 23, 2020

(65) Prior Publication Data

US 2020/0342075 A1 Oct. 29, 2020

Related U.S. Application Data

(60) Provisional application No. 62/838,864, filed on Apr. 25, 2019.

(51) Int. Cl.
| | | |
|---|---|---|
| *G06F 21/30* | (2013.01) | |
| *G06F 21/73* | (2013.01) | |
| *G06F 7/58* | (2006.01) | |
| *G06F 21/62* | (2013.01) | |
| *G06F 21/86* | (2013.01) | |
| *G06F 21/60* | (2013.01) | |

(52) U.S. Cl.
CPC ............. *G06F 21/305* (2013.01); *G06F 7/58* (2013.01); *G06F 21/602* (2013.01); *G06F 21/6272* (2013.01); *G06F 21/73* (2013.01); *G06F 21/86* (2013.01)

(58) Field of Classification Search
CPC ..... H04L 63/30; G06F 21/305; G06F 21/602; G06F 21/73

See application file for complete search history.

(56) References Cited

U.S. PATENT DOCUMENTS

| | | | | |
|---|---|---|---|---|
| 10,153,907 B2* | 12/2018 | Xu | | H04L 9/3213 |
| 2005/0268345 A1* | 12/2005 | Harrison | | H04L 63/104 |
| | | | | 726/27 |
| 2008/0091763 A1* | 4/2008 | Devonshire | | H04L 67/104 |
| | | | | 709/201 |
| 2016/0012228 A1* | 1/2016 | Sethumadhavan | | G06F 21/71 |
| | | | | 726/23 |
| 2019/0363894 A1* | 11/2019 | Kumar Ujjwal | | H04L 9/3268 |

* cited by examiner

*Primary Examiner* — William S Powers
(74) *Attorney, Agent, or Firm* — Steven Stupp

(57) ABSTRACT

This Application describes devices, and techniques for using them, capable of providing a secure hardware backdoor for digital devices, thus allowing valid access to secure target device data without the owner's consent, while still assuring the owner's knowledge whenever any access has occurred, whether validly or not. Each target device's data is protected by maintaining protected data encrypted on the target device, maintaining encryption keys for protected data in a "secure enclave", causing the secure enclave to generate secure data in response to a hardware trigger, the secure data being usable to provide access to the device, and providing relatively difficult yet achievable retrieval of the secure data with physical access to the target device, and using the secure data to access protected data on the target device, while also assuring that the target device's owner can determine when the secure data was retrieved.

20 Claims, 6 Drawing Sheets

Example Target Device

Figure 1: Example Target Device

Figure 2: Method 200

System 100

Figure 5: Method 500

SECURE HARDWARE BACKDOOR FOR DIGITAL DEVICES

CROSS REFERENCE TO RELATED APPLICATIONS

This application claims priority under 35 U.S.C. 119(e) to U.S. Provisional Application Ser. No. 62/838,864, entitled "Secure Hardware Backdoor for Digital Devices," by Stanton Kee Nethery, filed on Apr. 25, 2019, the contents of which are herein incorporated by reference.

BACKGROUND

Field of the Disclosure

This Application generally describes techniques relating to a secure hardware backdoor for digital devices, and other issues.

Related Art

Smartphones and other mobile devices sometimes maintain large amounts of data that their owners regard as private. However, law enforcement (and other entities) would often like to review the data. For example, law enforcement may wish to review that data as evidence or as part of an investigation. However, other entities, sometimes malicious, may attempt to access and use the data for less virtuous ends.

One problem that has arisen is that protecting smartphone data from malicious entities can prevent law enforcement, and other valid authorities, from valid access. For example, when data is protected by encryption and a password, the smartphone owner can deny access to valid authorities by refusing to release the password. Some governments, desiring law enforcement to have access to data on smartphones and other secure devices, have even banned the use of strong encryption on personal devices. On the other hand, disallowing the use of strong encryption of secure data, or providing any other method of access to smartphone data that does not require the password (sometimes called a "backdoor") would allow malicious entities who discover that backdoor to access that data improperly.

For example, backdoors that can be used without physical possession of the smartphone, sometimes called "software backdoors", may be used by malicious entities who are unknown to the smartphone's owner. Software backdoors may be used whenever the smartphone is coupled to a network, including a cell phone network or the Internet. Software backdoors may even be used without the owner knowing they were used; this may lead to the owner continuing to maintain private data on their smartphone even when it is already compromised.

In contrast, backdoors that can be used only when having physical possession of the smartphone, sometimes called "hardware backdoors", can be used by law enforcement, such as when executing a search warrant. Consequently, malicious entities would need to physically capture the smartphone before they could access its data. In either case, even though actually preventing someone who has physical possession of the smartphone from accessing its data may not, in general, be practical, the user would want to know whenever this occurs.

Each of these issues, as well as other possible considerations, may cause difficulty in aspects of providing valid access to smartphone data without the owner's consent, while still denying access to that data to malicious entities. Moreover, each of these issues, as well as other possible considerations, may cause difficulty in aspects of assuring the owner's knowledge whenever their smartphone data is accessed, whether validly or not.

SUMMARY OF THE DISCLOSURE

This summary of the disclosure is provided as a convenience to the reader, and does not limit or restrict the scope of the disclosure or the embodiments. This summary is intended as an introduction to more detailed description found in this Application, and as an overview of techniques explained in this Application. The described techniques have applicability in other fields and beyond the embodiments specifically reviewed in detail.

This Application describes devices, and techniques for using them, capable of providing a secure hardware backdoor for digital devices, thus allowing valid access to secure target device data without the owner's consent, while still assuring the owner's knowledge whenever any access has occurred, whether validly or not.

In one embodiment, each target device's data is protected by several techniques:
  (A) maintaining protected data encrypted on the target device, thus preventing hardware or software access without authorization;
  (B) maintaining encryption keys for protected data in a "secure enclave" (which may include a physically isolated processor and associated memory), not software accessible without authorization, and not hardware accessible without substantial effort;
  (C) causing the secure enclave to generate secure data in response to a hardware trigger, the secure data being usable to provide access to the device;
  (D) providing relatively difficult yet achievable retrieval of the secure data with physical access to the target device, and using the secure data to access protected data on the target device, while also assuring that the target device's owner can determine when the secure data was retrieved.

Techniques (A) and (B) can prevent access to the mobile device's data without authorization. Software access would require either breaking the encryption or obtaining encryption codes from an authorized user; this is intended to be infeasible. Hardware access would require deconstructing the target device, which would then become known to the mobile device's owner; this is intended to be difficult yet achievable, and to be detectable by the device's owner.

Techniques (C) and (D) can provide relatively difficult yet achievable access to the target device's protected data, when having physical access to the target device's hardware. Access to the secure enclave would also alter the unique identifier associated with the target device. Because the result of some function involving the unique identifier can be relatively easily retrieved from the target device, the owner can relatively easily determine whether unauthorized access has occurred, even if an attacker is validly authorized to access the device without the owner's consent, and even if an attacker has entirely deconstructed and rebuilt the target device.

BRIEF DESCRIPTION OF THE FIGURES

In the figures, like references generally indicate similar elements, although this is not strictly required.

Figure 1:
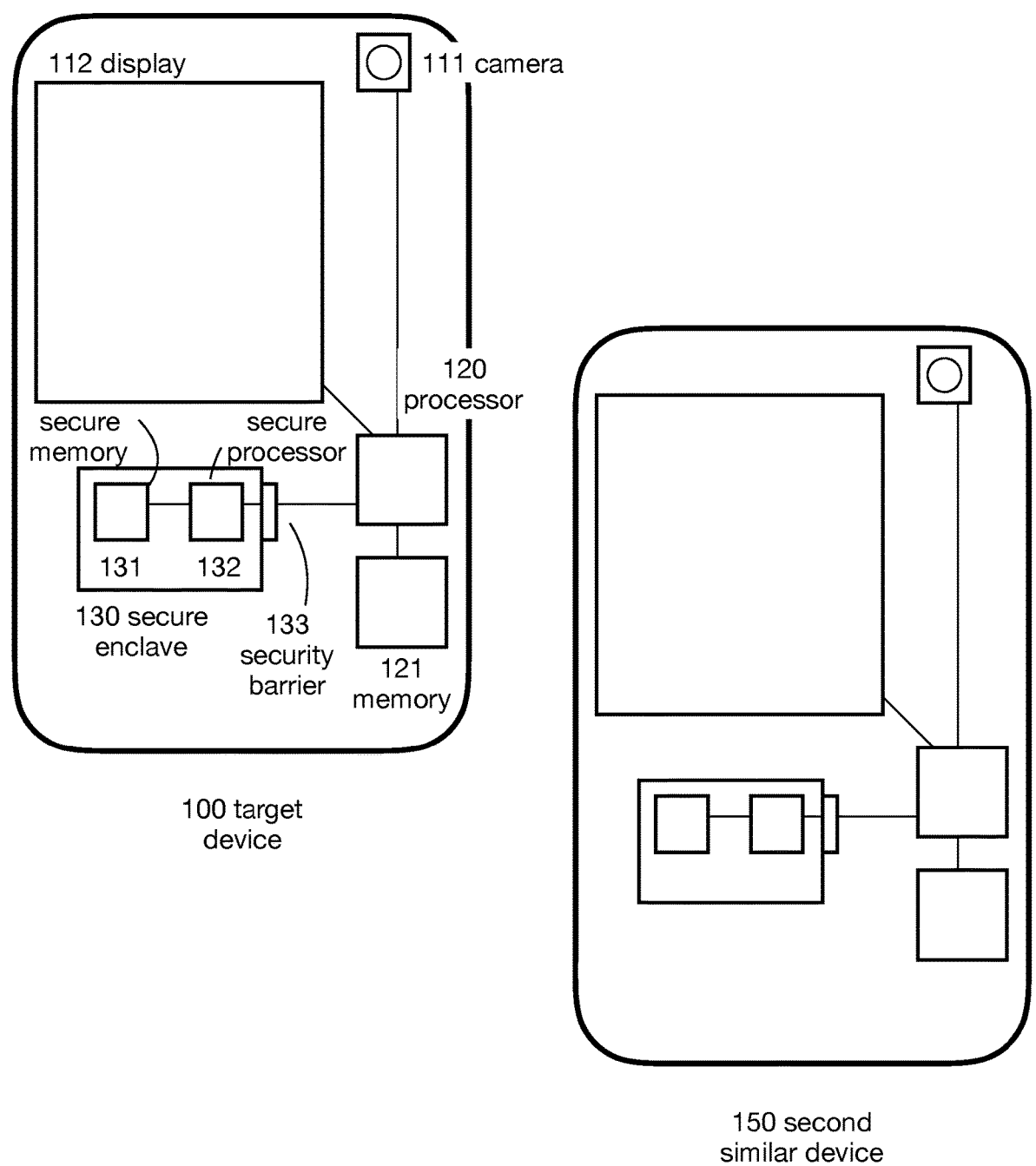
FIG. 1 shows a conceptual drawing of an example target device.

After reading this Application, those skilled in the art would recognize that the figures are not necessarily drawn to scale for construction, nor do they necessarily specify any particular location or order of construction.

DETAILED DESCRIPTION

This Application provides a secure hardware "backdoor" for digital devices, which allows valid access to secure target device data without the owner's consent, while still assuring the owner's knowledge whenever any access has occurred, whether validly or not. As further described herein, this Application describes devices and techniques which can allow valid access to device data without the owner's consent, while still informing the owner whenever any invalid access has occurred. For example, valid access to device data occurs when the owner provides any necessary keys or passwords to unlock the device. Invalid access to device data occurs when an attacker is able to unlock the device, or otherwise access its data, without authorization by the owner.

A prospective attacker (such as law enforcement with valid authority to seize and search the target device) physically seizes the target device to obtain access to the device's secure data. Using the secure data, the attacker can obtain encryption keys for the target device, and using those encryption keys, obtain access to the protected data. However, while physically seizing the device is relatively easy, obtaining access to the device's secure data is made substantially difficult, and is also deliberately made available to the device's owner when the device is returned.

In one embodiment, the target device is disposed to prevent any access to its data without a key, password, or other authorization element. For example, when the device is a smartphone, it can maintain itself locked and disallow use (except possibly for emergency calls) without entry of a proper password or authentication information (such as biometric password). In such cases, the device can maintain itself secure against attacks from outside the device. For example, the device can maintain a unique identifier or other secure data, and its own copy of its passwords, in a secure enclave; this can have the effect that attacks on the device's security should require physical access to the secure enclave, or at least require physical access to the device.

As further described herein, the tamper evident enclosure includes a unique identifier, such as embodied in a random (or pseudo-random) distribution of reflective or phosphorescent bits, such as glitter, or a random distribution of fuses or magnets, or another pattern that cannot easily be replicated. When light is shined on glitter, a reflective pattern can be provided that is substantially unique to the pattern of glitter and a pattern of incoming light. Because the reflective pattern is substantially unique to the pattern of glitter and the challenge pattern of incoming light, and because the pattern of glitter is difficult to replicate, an attacker piercing the tamper evident enclosure would cause the reflective pattern provided after the attack to differ from what it was before the attack.

Secure Device Elements

In one embodiment, in response to a trigger, the target device determines a sequence of secure device elements and a sequence of defined times at which those secure device elements are available. For example, the target device can determine the secure device elements by a sufficiently long sequence of secure one-way operations. Using secure one-way operations substantially prevents an attacker from "upstream" in the sequence, while still allowing the attacker to "downstream" in the sequence, when given secure device elements. Similarly, using secure one-way operations substantially prevents an attacker from determining the secure device's encryption keys from the secure device elements.

Once the target device determines a sequence of secure device elements, it can maintain those elements, and the times needed to determine them, in secure storage, such as within the secure enclave, in the target device. This can have the effect that the attacker can determine the secure device elements only by substantial mimicry of the target device. In one embodiment, the defined times can be specific enough that effective mimicry of the target device involves using a substantial hardware copy of the target device. In one embodiment, generating each secure device element can involve destructive use of one or more copies of the target device, thus possibly involving substantial expense each time a target device is attacked.

The defined times can also be long enough that, if any substantial portion of the sequence is extracted, the target device's owner would have strong evidence that the device was attacked, possibly successfully. For example, if the defined times collectively exceed 72 hours, the target device's owner would likely know that their device had been taken out of their custody. Moreover, if the device has been taken out of the owner's custody for less than that amount of time, the owner can be assured that no hardware attack has been successful. In one embodiment, the attacker would need to provide all the secure device elements to the target device in one timed sequence; thus, the attacker would have to seize the device for the entire duration to successfully obtain its protected data.

Security Challenge

In one embodiment, each secure device element from the target device challenges the attacker to predict the next secure device element in the sequence, and the time it will arrive. For example, the target device can present a challenge for an $(n)^{th}$ secure device element on a display, disposed for capture by the attacker by a camera on a substantially similar (second) device. The attacker can cause the second device to mimic the target device, thus providing, in response to the associated challenge, the $(n)^{th}$ secure device element on its own display, disposed for capture by the target device. If the attacker's prediction is incorrect or untimely (that is, either too quick or too slow) the target device can refuse to allow the attack. When the target device refuses to allow the attack, the hardware backdoor is not opened, and the attacker could try again from the beginning.

When the second device successfully mimics the target device for the entire sequence of secure device elements, the target device can (A) alter the unique identifier recorded in its secure enclave, and (B) provide access to the target device's protected data, such as by providing its encryption keys. This can have the effect that the attacker can obtain the protected data (such as in response to a valid law enforcement search), but only while revealing the successful attack to the device's owner.

Terms and Phrases

The phrase "target device", and variants thereof, generally refers to any device disposed to maintain data, such as secure data reserved for access by an owner or user of the device. For example, a mobile device can include a smartphone, an MP3 player, a laptop or notebook computer, a desktop computer or other computing device, a computing tablet or phablet, a wearable or implantable device, or any other relatively portable device disposed with capabilities as further described herein.

The phrase "second device", and variants thereof, generally refers to any device disposed to maintain data, such as a mobile device or another type of device, such as devices described with respect to the phrase "target device", disposed to interact with a target device to maintain challenge/response information, an electronic device or any other device disposed with capabilities as further described herein.

The term "random", and variants thereof, generally refers to any process or technique having a substantially non-predictable result, and includes pseudo-random processes and functions.

The phrases "one-way function", "secure hash", and variants thereof, generally refer to any process or technique in which a first set of data is transformed into a second set of data, and in which the first set of data cannot easily be determined from the second set of data by a recipient thereof. For example, encryption of the first set of data to provide the second set of data, in which the encryption key is unknown to the recipient, can be considered a one-way function.

The term "upstream", and variants thereof, generally refers to any process or technique for reversing the operation of a one-way function (for "upstream") and obtaining an earlier data value in a chain of data values provided by repeated iteration of the one-way function. Similarly, the term "downstream", and variants thereof, generally refers to any process or technique for continuing with further operation of a one-way function (for "upstream") and obtaining a later data value in a chain of data values provided by repeated iteration of the one-way function.

The phrase "challenge/response", and variants thereof, generally refers to any process or technique in which two devices exchange a challenge portion, including a first set of data, and a response portion, including a second set of data, and in which the response portion matches an expected set of data associated with the challenge portion.

The phrase "hardware backdoor", and variants thereof, generally refers to any process or technique in which an attacker with physical access to a target device can read protected data from that target device, without the target device being vulnerable to having its protected data read without physical access thereto.

Figures and Text

Target Device

FIG. 1 shows a conceptual drawing of an example target device.

Devices can include elements as described herein. While the elements are shown and described in particular locations, with particular sizes, and disposed in particular configurations, in the context of the embodiments, there is no particular requirement for any such limitation. Except where explicitly stated, the figures are not necessarily drawn to scale, and there is no particular requirement for the elements to be located or disposed as shown.

As further described herein, a target device 100 can include a hardware backdoor, which can be subject to an attack including a physical seizure of the target device 100. The hardware backdoor can be attacked using one or more second devices 150, as further described herein, such as disposed to mimic the data manipulation performed by the target device 100.

The target device 100 is described with respect to elements as shown in FIG. 1, and as otherwise described herein, such as:

a camera 111, an image sensor or another input element, as further described herein;

a display 112, or another output element, as further described herein;

a processor 120, possibly coupled to one or more memory elements 121 such as RAM (random access memory), SSD (solid state devices), or other types of storage;

a secure enclave 130, such as further described herein, possibly including one or more physical elements such as a secure memory 131 (as further described herein), a secure processor 132, and a security barrier 133;

other elements, as further described herein, for possible use to perform functions described herein, or otherwise.

In the target device 100, the camera 111, or another input element, can be coupled to the processor 120. The processor 120 can be disposed to receive information from the camera 111, such as a request for one or more challenges for secure device elements. The processor 120 can be disposed to maintain one or more secure device elements in the secure enclave 130. As further described herein, the processor 120 can be disposed to present one or more secure device elements to the second device 150, and to compare responses from the second device 150 with secure device elements maintained in the secure memory 131 in the secure enclave 130.

As further described herein, the secure enclave 130 can be disposed to require substantial effort by an attacker to penetrate. In one embodiment, the secure enclave 130 can be disposed to require all its inputs to be presented at the security barrier 133, where they can be received by the secure processor 132. The secure processor 132 can, possibly using the secure memory 131, perform all security operations on the target device 100. For example, the secure enclave 130 can be disposed to perform all of the target device's encryption/decryption operations, secure one-way functions, or hash encoding operations, and challenge/response operations.

Secure Device Elements

Figure 2:
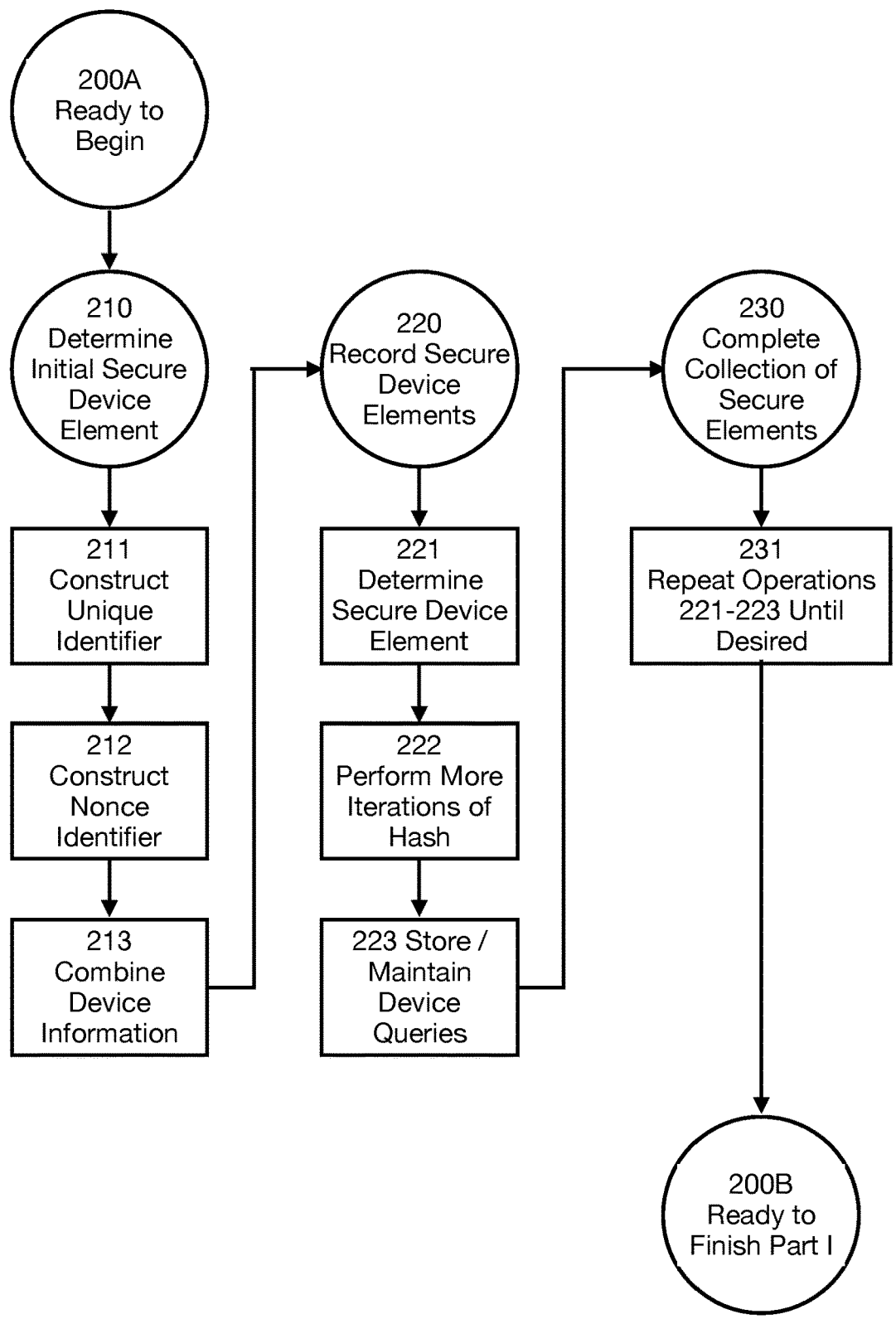
FIG. 2 shows a conceptual drawing of an example method of determining a sequence of secure device elements by a target device.

FIG. 2 shows a conceptual drawing of an example method of determining a sequence of secure device elements by the target device 100.

Methods of operation can include operations as described herein. While the operations are shown and described in a linear order, in the context of the embodiments, there is no particular requirement for any such limitation. Except where explicitly stated, there is no particular requirement for the operations to be encountered or performed linearly, or in any particular order or by any particular device. For example, and without limitation, the operations can be encountered or performed in parallel, in a pipelined manner.

A method 200 includes flow points and method operations as shown in FIG. 2, and as otherwise described herein, such as:

a flow point 200A, in which the method 200 is ready to begin determining secure device elements;

a flow point 210, in which the method 200 is ready to determine an initial secure device element;

a flow point 220, in which the method 200 is ready to determine and record secure device elements;

a flow point 230, in which the method 200 is ready to complete the collection of secure device elements;

a flow point 200B, in which the method 200 is ready to finish part I.

Beginning of Method

A flow point 200A indicates that the method 200 is ready to begin determining secure device elements.

The flow point 200A can be triggered by one or more of the following:

an alert from the target device 100, such as when the target device 100 or the second device 150 is powered on or activated, or otherwise reset as further described herein;

a user input from the target device 100, such as a request by the user to reset the target device 100, such as using a selected function of the target device 100 (such as selected sequence of key presses or a selected sequence of gestures on a smartphone capacitive display);

a message from an external device, such as a request by an owner to reset the target device 100, such as using an SMS or MMS message, a Wi-Fi connection, a "find my device" function or a "reset my device" function, or otherwise, or as otherwise described herein.

In one embodiment, the flow point 200A can be triggered when the target device 100 is initially powered on, such as when its initial power-on sequence is completed.

As further described herein, the flow point 200A can also be triggered when the target device's hardware backdoor is used, that is, when any second device (or a set thereof) causes the target device 100 to reveal its encryption keys. In such cases, the target device 100 can reset its unique identifier and re-determine its secure device elements, as described with respect to the flow point 200A. The target device 100 can then reveal its encryption keys and allow the attacker (such as a law enforcement officer) to read its stored encrypted data.

The method can proceed with the next flow point.

Determining Initial Secure Device Element

A flow point 210 indicates that the method 200 is ready to determine a sequence of secure device elements.

At an operation 211, the target device 100 can construct a unique identifier to be maintained in its secure memory 131. The unique identifier can include a secure set of data, not easily discoverable without using the hardware backdoor described herein. In one embodiment, the unique identifier can be set when the target device 100 is first powered-on, and can also be reset in response to the flow point 200A described above, so that it is not known to anyone, including the device manufacturer, without using the hardware backdoor described herein.

In one embodiment, the target device 100 can use its unique identifier to construct encryption keys. The encryption keys can be maintained in its secure memory 131 and used to encrypt and decrypt data to be maintained secure against reading by persons who are not authorized to use the target device 100. For example, the secure enclave 130 can include a secure processor 132 that uses the encryption keys to encrypt all data maintained secure, such as in response to requests to encrypt data presented to the secure enclave 133.

As further described herein, the flow point 200A can be triggered in response to completing an initial power-on process for the target device 100, or in response to a successful use of the hardware backdoor. Thus, except for actual use of the hardware backdoor, such as by a validly authorized law enforcement officer, the target device 100 can maintain its data secure against review.

At an operation 212, the target device 100 can construct a "nonce identifier", that is, a data element intended to be used only once.

At an operation 213, the target device 100 can combine the unique identifier from its secure memory 131, the "nonce identifier", and possibly other information with respect to the device. For example, the other information can include information with respect to the device's specifications, such as its IMSI number (when the device includes a smartphone), its make and model, its memory size, and possibly otherwise. In one embodiment, the target device 100 can use the unique identifier, the nonce identifier, and any security keys preloaded into the target device 100 by the manufacturer, to initialize determination of the secure device elements.

The data used by the target device 100 to initialize determination of the secure device elements is sometimes referred to herein as the $(zero)^{th}$ secure device element. As further described herein, the $(zero)^{th}$ secure device element can be used as a challenge portion of a challenge/response to a second device 150, which should provide the response portion of that challenge/response by present at least the $(1)^{st}$ secure device element.

The method can proceed with the next flow point.

Determining Following Secure Device Elements

At a flow point 220, the target device 100 is ready to determine a sequence of secure device elements.

At an operation 221, the target device 100 can determine, in response to the $(n)^{th}$ secure device element, an $(n+1)^{st}$ secure device element. The target device 100 starts with the $(zero)^{th}$ secure device element, and determines the $(1)^{st}$ $(2)^{nd}$, $(3)^{rd}$ and other, secure device elements in response thereto.

As part of this operation, the target device 100 can determine a one-way function of the $(zero)^{th}$ secure device element. In one embodiment, the target device 100 can determine a result of the SHA3-224 (as an example of a) hash function, starting with the $(zero)^{th}$ secure device element and iteratively applied until a selected condition is reached. This can have the effect that repeatedly applying the hash function can take a significant amount of time. For example, it is possible that the hash function may be iteratively applied millions of times until the selected condition is reached.

For example, the selected condition can include that the last five characters of the hash function equal the character string "Steve". For another example, the selected condition can include that the $5^{th}$ character of the hash function is "S", the $8^{th}$ character is "A", the $13^{th}$ character is "S", and the $21^{st}$ character is "W". For another example, the selected condition can include that a sum of characters of the hash function is a multiple of 314159. The target device 100 can use any selected condition that can be reasonably tested for.

Because of the substantially random appearance of the results of performing the hash function, the more stringent the selected condition, the more time is likely required to reach a result of performing the hash function that meets the selected condition. As further described herein, the target device 100 can select a more stringent condition, or select a less stringent condition, in response to whether the target device 100 desires to take more or less time. Alternatively, the target device 100 can pause for a selected amount of time each time it applies the hash function; this can have the effect that each hash function takes longer, and the total amount of time to determine a hash function with a result having the selected condition will be longer.

At an operation 222, the target device 100 can determine a few more iterations of the hash function, performed on the result that met the selected condition. For example, the target device 100 can repeatedly iterate the hash function 4 more times, although any other reasonable number of additional times would be workable. A result of this further iteration of the hash function is sometimes referred to herein as an $(n+1)^{st}$ secure device element. Thus, the target device 100 can determine, in response to the (zero) secure device element, the $(1)^{st}$ secure device element, and in response to the $(1)^{st}$ secure device element, the $(2)^{nd}$ secure device element, and so on for as many secure device elements the target device 100 desires to determine.

As further described herein, the target device 100 can maintain one or more $(n)^{th}$ secure device elements, each as a challenge portion of a challenge/response, for each of which the $(n+1)^{st}$ secure device element is the response portion thereof. Alternatively, the target device 100 can maintain an intermediate data value in the sequence of data values obtained by repeated iteration of the hash function, thus at least somewhat downstream of the $(n)^{th}$ secure device element and significantly upstream of the $(n+1)^{st}$ secure device element. In such cases, the intermediate data value, downstream of the $(n)^{th}$ secure device element, can be maintained as the challenge portion, and the $(n+1)^{st}$ secure device element can be maintained as the response portion, of the challenge/response.

At an operation 223, the target device 100 can store and maintain the challenge/responses associated with one or more secure device elements, such as starting with the $(1)^{st}$ secure device element and continuing to a $(10)^{th}$ secure device element, each one together with the time needed to find it, in its secure memory 131. For example, when the target device 100 determines 10 secure device elements, it can maintain those challenge/response data values and timing values for 10 secure device elements in its secure memory 131.

As part of this operation, alternatively, the target device 100 can store and maintain the challenge/responses associated with secure device elements other than the sequence of the $(1)^{st}$ through $(10)^{th}$ secure device elements. For example, the target device 100 can maintain a sequence of 20 secure device elements or 30 secure device elements, and can determine, at the time the second device 150 requests use of the target device 100 hardware backdoor, which sequence of 10 such secure device elements to use for challenge/responses. For another example, the target device 100 can maintain a relatively large number (such as 50) such secure device elements, and can select 10 such secure device elements to use for challenge/responses, not necessarily in any particular order, at the time the second device 150 requests use of the target device 100 hardware backdoor. Thus, the target device 100 can use the $(3)^{rd}$, $(1)^{st}$, $(4)^{th}$, $(15)^{th}$, $(9)^{th}$, $(26)^{th}$, $(5)^{th}$, $(35)^{th}$, $(8)^{th}$, and $(32)^{nd}$, such secure device elements at one time, and a different set of secure device elements at another time. This can have the effect that the target device 100 can increase the difficulty for the set of second devices of responding to the set of challenge/responses.

The method can proceed with the next flow point.

A Complete Set of Secure Device Elements

At a flow point 230, the target device 100 is ready to complete its collection of a set of secure device elements.

At an operation 231, the target device 100 repeats the operations associated with the flow point 220, until it has at least a minimum desired number of secure device elements. In one embodiment, the minimum selected number is 10 secure device elements. Also in one embodiment, an approximate time needed to determine the minimum selected number of secure device elements is about 72 hours.

As part of this operation, when the target device 100 has determined some secure device elements too rapidly, it can use more stringent selected conditions for determining later secure device elements, so as to obtain 10 secure device element in about 72 hours. Similarly, when the target device 100 has determined some secure device elements too slowly, it can use less stringent selected conditions for determining later secure device elements, so as to obtain 10 secure device element in about 72 hours.

For example, if the target device 100 takes about 70 hours to determine the $(1)^{st}$ through $(8)^{th}$ secure device elements, it can use less stringent selected conditions to determine the $(9)^{th}$ and $(10)^{th}$ secure device elements. For example, the target device 100 can require only that the last 3 characters of the result of the hash function are "420" or only that the last 2 characters of the result of the hash function are "69".

While this Application describes, in one embodiment, that the target device 100 determines a linear sequence of 10 secure device elements whose computation adds up to about 72 hours, in the context of the embodiments, there is no particular requirement for any such limitation. For example, the target device 100 can determine a substantially larger set of secure device elements, and can select among them for $(n)^{th}$ and $(n+1)^{st}$ secure device elements to use as challenge/responses to the attacker attempting to use the hardware backdoor.

For another example, the target device 100 can maintain 20 such secure device elements, in which it can select individual operations from the $(n)^{th}$ to $(n+1)^{st}$ secure device elements to present to the second device 150 as a challenge/response, and in which the target device 100 can present a sufficient set of challenge/responses that collectively take 72 hours to determine, in whatever order they are presented. In such cases, the target device 100 can select the $(n)^{th}$ and $(n+1)^{st}$ secure device elements so as to add up to 72 hours, or such other time the target device 100 selects.

For another example, the target device 100 can determine a substantially larger set of secure device elements, in which determining from the $(n)^{th}$ to $(n+1)^{st}$ secure device elements takes a recorded time duration. For example, the target device 100 can maintain 50 such secure device elements, in which it has about 10 to 20 sequences that collectively take 72 hours to determine in the order in which they were generated.

End of Method

A flow point 200B indicates that the method 200 is ready to finish determining secure device elements. The method 200 finishes operations and cleans up after any ongoing operations associated with determining secure device elements and recording them in the secure memory 131.

For example, the target device 100 can de-allocate and possibly erase any buffer storage or terminated storage values in the secure memory 131, and can perform any terminating routines with respect to recording the secure device elements in the secure memory 131.

In one embodiment, the method 200 can be restarted as triggered by any technique described with respect to the flow point 200A.

In one embodiment, the method 200 can be restarted whenever the hardware backdoor is used, the protected data is accessed, and the target device 100 is restored. This can have the effect that the target device's unique identifier can be changed whenever the hardware backdoor is used. Thus, the target device's owner can be provided with clear evidence whenever the hardware backdoor is used.

Triggering Hardware Backdoor

Figure 3:
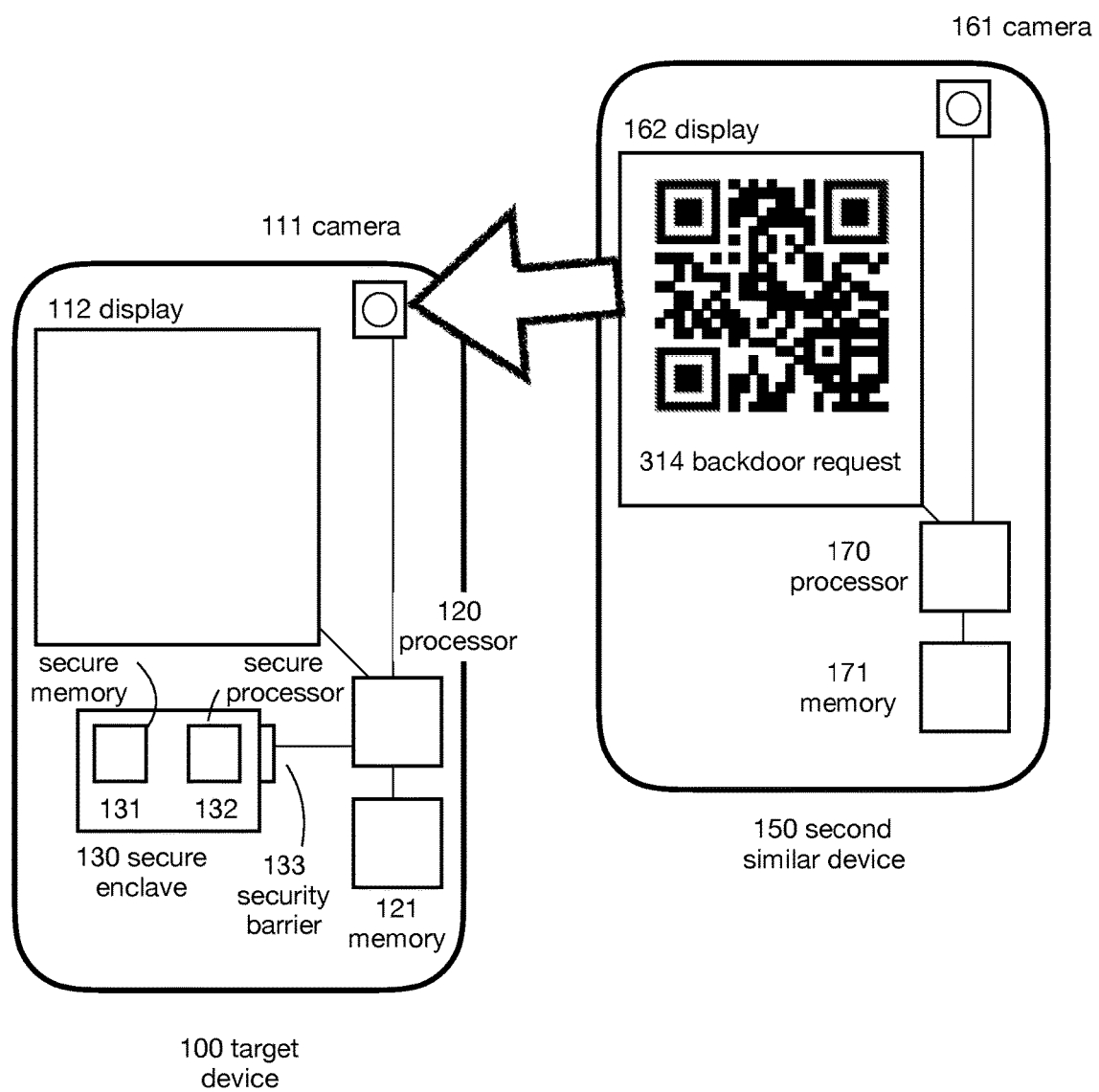
FIG. 3 shows a conceptual drawing of an example request to a target device to access its hardware backdoor.

FIG. 3 shows a conceptual drawing of an example request to the target device 100 to access its hardware backdoor.

A second device 150 is also described with respect to elements as shown in the figure, and as otherwise described herein, such as including another camera 161 or image sensor, another display 162, another processor 170, another memory 171, and possibly other elements, as further described herein, or otherwise. In one embodiment, the second device 150 interacts with the target device 100 using a hardware backdoor request 314, an example of which is shown in FIG. 3 as a QR code.

In one embodiment, the second device 150 is substantially identical to the target device 100, containing the same selected conditions that may or may not be known to the device manufacturer. This can have the effect that the second device 150 can perform the same operations as the target device 100 in the same amount of time. Thus, when the target device 100 requests the second device 150 to determine, in response to the challenge portion of the challenge/response associated with the $(n)^{th}$ secure device element, the response portion thereof, the second device 150 should provide the correct response in approximately the same time as the time recorded by the target device 100.

In one embodiment, to make the hardware backdoor request 314, the second device 150 is initialized in a unique hardware backdoor mode, distinct from operation as an ordinary device of the same type. When initialized in this mode, the second device 150 triggers a fuse or otherwise makes itself unable to perform the hardware backdoor more than once, and also unable to operate as an ordinary device of the same type. Accordingly, when the second device 150 is used to perform hardware backdoor access to the target device 100, the second device 150 is effectively exhausted for use as any device.

For example, when the target device 100 is a smartphone such as an iPhone X™, the second device 150 should also be an iPhone X™, and after use as described herein, is no longer useful either for making hardware backdoor request, or as an ordinary smartphone; it is effectively destroyed by the operation. As the target device's hardware backdoor involves providing 10 secure device elements, the attacker (even when validly authorized to do so) would expend 10 such second devices 150 to operate the hardware backdoor. Moreover, a stock of older models for use as such second devices 150 would be needed for use when the target device 100 is an older model. It is expected that this expense would not be taken lightly.

While it is possible that an attacker (even when authorized, such as law enforcement conducting a valid search) may attempt to use a different type of device as the second device 150, that attacker would have to adjust the timing of their response to the target device 100 to match the time the target device 100 has recorded would be needed to determine the operations between the challenge and response portions of the challenge/response associated with the $(n)^{th}$ secure device element. Because the target device 100 would reject the hardware backdoor if the second device's timing is incorrect, the attacker would need the full 72 hours to use the hardware backdoor, even if the attacker can circumvent the requirement of using 10 such second devices 150.

While this Application describes, in one embodiment, triggering the hardware backdoor using the second device 150, in the context of the embodiments, there is no particular requirement for any such limitation. In alternative embodiments, the hardware backdoor can be triggered by operations on the target device 100 alone. For example, the hardware backdoor could be triggered by a sequence of keys, a sequence of one or more screen gestures, by changing one or more settings, by entering a (law enforcement) password, or by some combination of more than one such operation.

In one embodiment, when the processor 120 in the target device 100 receives the hardware backdoor request 314, it can send one or more of the secure device elements to the second device 150, and require the second device 150 to respond with one or more following secure device elements. In such cases, the target device 100 can require the second device 150 to match both the correct response and the correct timing of the response. In one embodiment, the target device 100 can allow some amount of leeway in the correct timing of the response, such as plus or minus 10% timing error, or some other amount of leeway.

This can have the effect that the target device 100 provides a challenge portion of a challenge/response to the second device 150. The target device 100 can test the second device's response portion of the challenge/response for accuracy. Because the operations from the challenge to the response for the $(n)^{th}$ secure device element are one-way functions, the second device 150 cannot easily determine the target device's unique identifier from any of them. Also, because the operations from challenge to the response for the $(n)^{th}$ secure device elements are computationally intensive, the second device 150 cannot easily determine the result without actually performing those computations. Thus, operations from the challenge to the response for the $(n)^{th}$ secure device elements can perform the function of a challenge/response to which the second device 150 must match both the correct response and the correct timing of the response.

Because each such second device 150 is destroyed by providing the response to the challenge/response, when the target device 100 issues 10 such challenges, providing the responses to those challenge/responses require the attacker to destroy an equal number of such second devices 150. When the target device 100 is an older model, the attacker may no longer have the needed supply of such second devices 150, or the needed supply of such second devices may no longer exist. When the target device 100 is a recent model, the attacker may be unable to easily obtain the needed supply of such second devices 150, or may balk at the cost. Moreover, the manufacturer of the target device 100 can increase the time and cost to the attacker by designing the target device 100 to issue a larger number, such as 20-30, possibly a much larger number such as 200-300, such challenge/responses. This can have the effect that even valid law enforcement access could require a relatively large number of such second devices 150, and could require a relatively large amount of time, possibly as long as several weeks or months. This can have the effect that the target device 100 is subject to valid law enforcement access, but at a cost comparable to a high-security safe.

Security Challenge Using $(1)^{st}$ Secure Device Element

Figure 4:
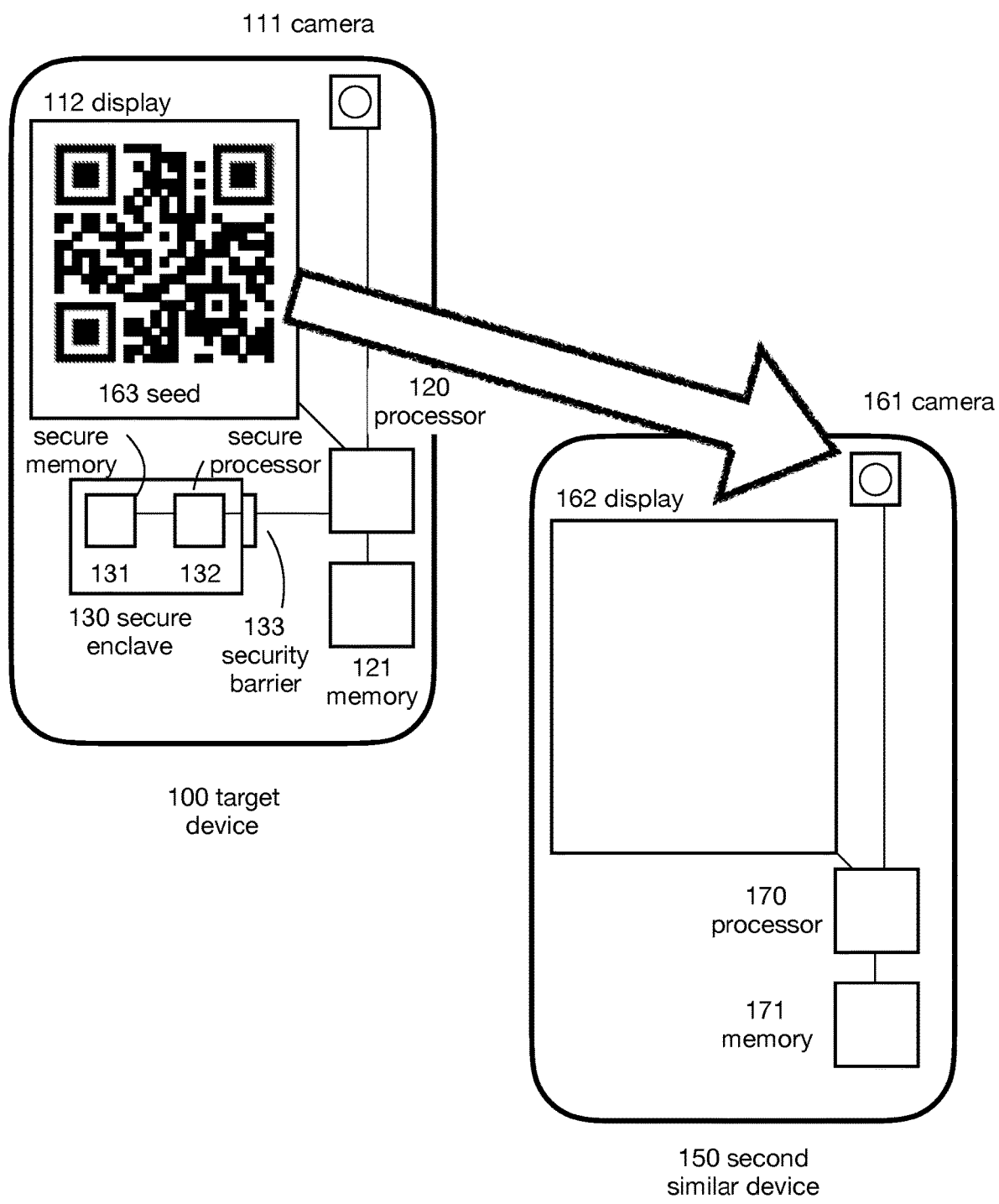
FIG. 4 shows a conceptual drawing of an example release of a secure device element from a target device to a second device.

FIG. 4 shows a conceptual drawing of an example release of a secure device element from the target device 100 to the second device 150.

As further described herein, the target device 100 includes a display 112 on which it can present one or more images, such as a QR code (e.g., a one or two-dimensional barcode pattern), another still image, a motion picture image, another type of image, an image including information using steganography, or otherwise.

As further described herein, the target device's processor 120 can present the challenge portion of the challenge/response associated with the $(1)^{st}$ secure device element on the target device's display 112. The second device 150 can be disposed to receive that challenge portion at its camera 161.

The second device's camera 161 can be coupled to the second device's processor 170. The second device's processor 170 can store and maintain the challenge portion of the challenge/response associated with the $(1)^{st}$ secure device element in the second device's memory 171.

The second device's display 162 can be coupled to the second device's processor 170. The second device's processor 170 can cause the second device's display 162 to present one or more images, such as a QR code, another still image, a motion picture image, another type of image, an image including information using steganography, or otherwise.

As further described herein, the second device's processor 170 can present the response portion of the challenge/response associated with the $(1)^{st}$ secure device element on the second device's display 162. The target device 100 can be disposed to receive that challenge portion at its camera 111.

As further described herein, once the second device 150 presents its response to the challenge/response associated with the $(1)^{st}$ secure device element, the second device 150 blows a fuse, sets a data value, or otherwise disables itself from being used as a second device 150 in the context of the hardware backdoor, or even as an ordinary device of its type. Thus, the second device 150 is effectively destroyed or otherwise rendered useless. This can have the effect that additional such second devices 150 would be needed to respond to the following challenge/responses, and that the price associated with each such second device 150 is expended for each such challenge/response.

Security Response Using $(2)^{nd}$-$(10)^{th}$ Secure Device Elements

Figure 5:
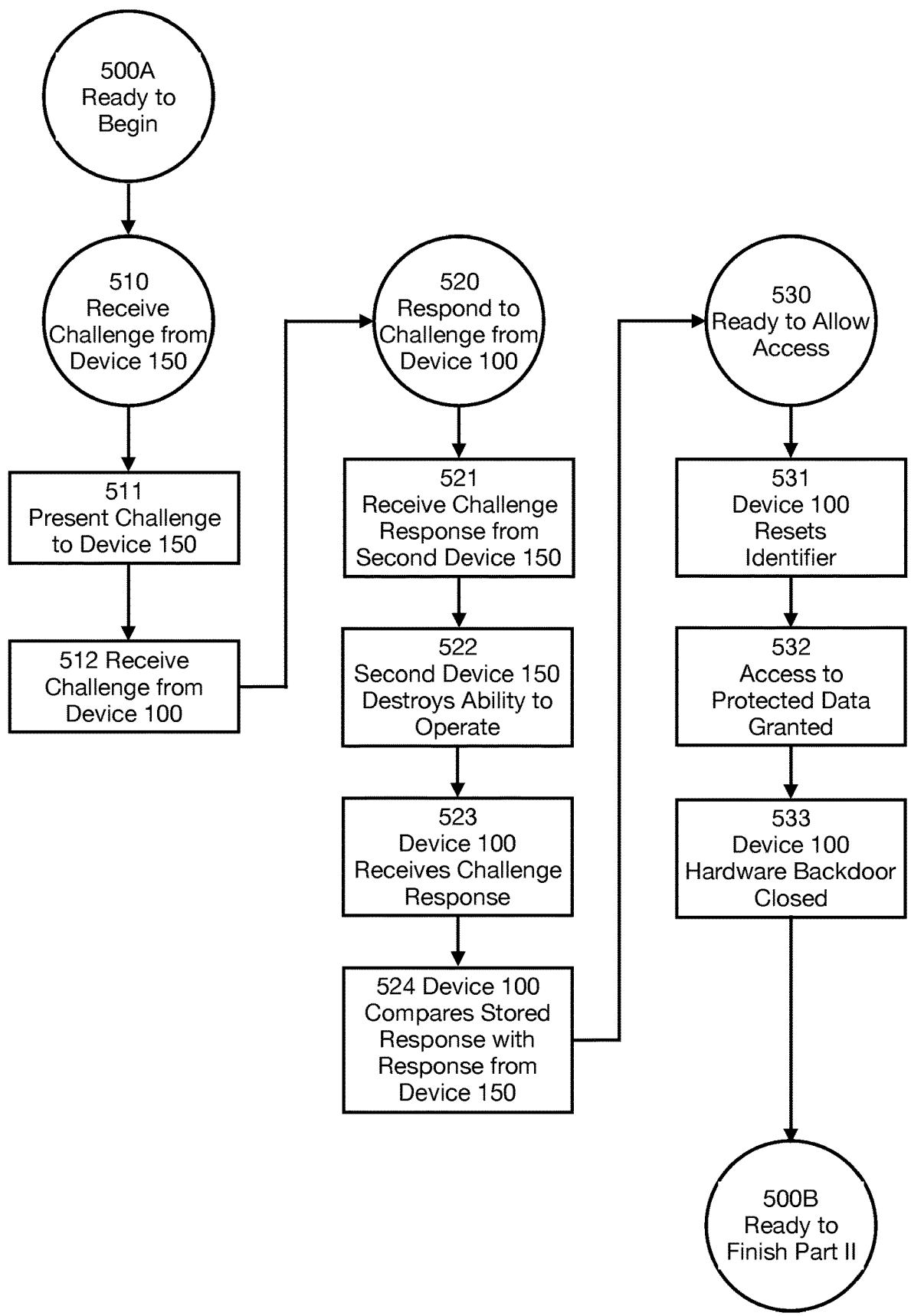
FIG. 5 shows a conceptual drawing of an example method of confirming following secure device elements.

FIG. 5 shows a conceptual drawing of an example method of confirming following secure device elements.

A method 500 includes flow points and method operations as shown in FIG. 3, and as otherwise described herein, such as:
- a flow point 500A, in which the method 500 is ready to begin determining secure device elements at the second device 150;
- a flow point 510, in which the method 500 is ready to receive a challenge portion of a challenge/response at the second device 150;
- a flow point 520, in which the method 500 is ready to respond to challenge/responses from the target device 100;
- a flow point 530, in which the method 500 is ready to allow access using the hardware backdoor on the target device 100;
- a flow point 500B, in which the method 500 is ready to finish part I.

Beginning of Method

A flow point 500A indicates that the method 500 is ready to begin determining secure device elements.

The flow point 500A can be triggered by one or more of the following:
- a request to the target device 100, such as from one or more second devices 150, to invoke the target device's hardware backdoor;
- or otherwise, or as otherwise described herein.

This Application primarily describes the input element to the target device 100 as a still camera 111 disposed to receive the challenge portions of the challenge/responses associated with the $(2)^{nd}$-$(10)^{th}$ secure device elements, such as in the form of a QR code or other still picture. However, in the context of the embodiments, there is no particular requirement for any such limitation. In one embodiment, the input element can include any other sensor disposed to receive data from another device such as the second device 150. For example, the input element can include a motion picture camera; a microphone; another type of electromagnetic receiver such as a NFC (near-field communication) device, an RFID (radio frequency identifier) device, a Wi-Fi device, or a cellular modem; a haptic information receiver such as an accelerometer; or otherwise.

Moreover, while this Application primarily describes the input element and a corresponding output element as using the same modes of information transmission (in the primary description, a still picture in response to a still picture), in the context of the embodiments, there is no particular requirement for any such limitation. For example, the challenge portion of the challenge/response can include a still picture, while the response portion of the challenge/response can include information transmission in another mode (such as an audio signal in response to a still picture, a haptic signal such as generated by a buzzer or vibrator in response to an NFC signal, an electromagnetic signal or otherwise).

Receiving Initial Secure Device Element

At a flow point 510, the method 500 is ready to receive, at the second device 150, a challenge portion of a challenge/response associated with an $(n)^{th}$ secure device element.

At an operation 511, the target device 100 has already generated a sequence of secure device elements (including their timing) and has stored and maintained them in its secure memory 131. The target device 100 can present a challenge portion associated with a challenge/response associated with the $(n)^{th}$ secure device element to the $(n^{th}$ such) second device 150. As further described herein, each such challenge/response associated with the $(n)^{th}$ secure device element is directed to a separate $(n^{th}$ such) second device 150, as each such second device 150 is destroyed by presenting the response to that challenge/response.

In a first case when this step is performed, the challenge portion of the challenge/response associated with the $(n)^{th}$ secure device element can include an initial challenge associated with the $(1)^{st}$ secure device element, and the $(n^{th}$ such) second device 150 can include the (first such instance of) second device 150.

In succeeding cases when this step is performed, each succeeding $(n+1)^{st}$ challenge portion can be associated with the $(n+1)^{st}$ secure device element. As further described herein, each such challenge portion is associated with a one-way function that, when repeatedly iterated, provides the response portion associated with that $(n+1)^{st}$ secure device element. Moreover, each such response portion is associated with a timing value within which the $(n^{th}$ such) second device 150 must comply to have a correct response.

As further described herein, the first and succeeding challenge/responses can include data values and timing values other than the $(1)^{st}$-$(10)^{th}$ secure device element. For example, the first and succeeding challenge/responses can include a selected sequence of 10 data values and timing values from a stored and maintained set of first 20-30 secure device element. For another example, the first and succeeding challenge/responses can include a selected set of randomly (or otherwise) selected 10 data values and timing values from a stored and maintained set of an arbitrarily large set of secure device elements. As further described herein, each challenge/response between the target device 100 and a corresponding second device 150 can use a new, so-far-unused, unique second device 150.

At an operation 512, the ($n^{th}$ such) second device 150 can receive the challenge portion of the challenge/response associated with the $(n)^{th}$ secure device element from the target device 100.

The method 500 can proceed with the flow point.

Responding with Further Secure Device Elements

At a flow point 520, the method 500 is ready to respond to challenge/responses from the target device 100.

At an operation 521, the ($n^{th}$ such) second device 150 can perform the same determination of the response portion of the challenge/response associated with the $(n)^{th}$ secure device element. Thus, the ($n^{th}$ such) second device 150 can provide the correct data value and timing value of the response portion of the challenge/response associated with the $(n)^{th}$ secure device element. This would be the same $(n)^{th}$ secure device element that the target device 100 determined for itself.

At an operation 522, the ($n^{th}$ such) second device 150 can optionally destroy its own ability to operate, either as a second device 150 performing the operations described herein, or as an ordinary smartphone or other device. As further described herein, this should impose a significant cost on the attacker using the hardware backdoor.

At an operation 523, the target device 100 can receive the data value and timing value of the response to the challenge/response associated with the $(n)^{th}$ secure device element from the ($n^{th}$ such) second device 150.

At an operation 524, the target device 100 can compare the data value and timing value of the response to the challenge/response associated with the $(n)^{th}$ secure device element from the ($n^{th}$ such) second device 150, with the correct data value and timing value. The "correct" data value and timing value include those the target device 100 maintains in its secure memory 131.

As part of this operation, if both the data value and timing value are correct (that is, if the data value is correct for all bits, and the timing value is correct to within a threshold amount, such as 10%), the target device 100 can accept the response portion of the challenge/response associated with the $(n)^{th}$ secure device element. In such cases, the method 500 can proceed with the next flow point.

As part of this operation, if either the data value or the timing value are incorrect (that is, if the data value is incorrect for any bit, or the timing value is incorrect by more than a threshold amount, such as 10%), the target device 100 can reject the use of the hardware backdoor. The ($1^{st}$ such) through ($n^{th}$ such) second devices 150 that were used should remain destroyed. The method 500 can proceed with the flow point 500B, where it terminates. (The attacker can try again with additional such second devices 150, if it so desires.)

Obtaining Access Using the Hardware Backdoor

At a flow point 530, the method 500 is ready to allow access using the hardware backdoor on the target device 100.

At an operation 531, the target device 100 resets its unique identifier to a newly selected value. In one embodiment, the newly selected value can include a new random value; this can have the effect that the attacker and the manufacturer do not know the new unique identifier, and the effect that the target device's owner can determine whether the hardware backdoor has been used. Altering the unique identifier also triggers the flow point 500A, possibly after the attacker has finished using the hardware backdoor.

At an operation 532, the attacker can review protected data from the secure memory 121. In one embodiment, while the attacker is allowed to review protected data, the attacker is not allowed to review the unique identifier or any encryption or decryption keys.

At an operation 533, when the attacker is finished reviewing protected data from the secure memory 121, the target device 100 returns to refusing unauthorized access to protected data. Use of the hardware backdoor is finished.

The method 500 can proceed with the next flow point.

End of Method

A flow point 500B indicates that the method 500 is ready to finish part I (recording the first challenge/response). The method 200 finishes operations and cleans up after any ongoing operations associated with part II.

As further described herein, in one embodiment, the second device 150 will terminate operations and no longer be usable, either as an ordinary second device 150, or as a device capable of performing hardware backdoor operations, as further described herein. As further described herein, this imposes a significant expense on the attacker, even if conducting a valid law enforcement search, to use the hardware backdoor associated with the target device 100.

In one embodiment, the method 500 can be restarted as triggered by any technique described with respect to the flow point 500A. For example, if law enforcement desires to re-access the target device 100 using the hardware backdoor, the method 500 can be restarted using a new set of second devices 150, which will be used up by performance of the method 500.

Countermeasures

As further described herein, it is possible that the attacker can use a different such second device 150, such as a supercomputer or other device disposed to rapidly compute the hash function or other one-way function used by the target device 100. In order to avoid this countermeasure, the target device 100 is disposed to require both a correct data value and a correct timing value as part of each response to a challenge/response. For example, if the attacker can determine the responses for multiple challenge/responses much faster than the target device 100, the target device 100 can determine that the hardware backdoor is being used improperly, and can reject the attack.

Moreover, if the target device 100 determines that the timing values for response to the challenge/responses are consistently fast, or otherwise statistically inconsistent with the attacker using the same type of second device 150 as the target device 100, the target device 100 can determine that the hardware backdoor is being used improperly, and can in such cases also reject the attack.

Alternative Embodiments

Although this Application primarily describes one set of preferred techniques for informing the owner whenever any invalid access to their target device has occurred, in the context of the embodiments, there is no particular requirement for any such limitation. Other or similar techniques for informing the owner of invalid access would also be workable, and are within the scope and spirit of this description. After reading this Application, those skilled in the art would be able to incorporate such other techniques with the techniques shown herein.

In some embodiments, an electronic device (such as a cellular telephone) has a secure enclave with a processor and memory. The memory may store program instructions and secure data. Moreover, the processor may execute the program instructions to perform operations in a security technique. Notably, the processor may create or generate a current unique identifier (such as a random number or a pseudorandom number, e.g., a seed number) associated with the electronic device whenever a condition occurs. For example, the condition may include: when the electronic device is powered on, when the electronic device is reset, when the electronic device is activated, and/or when a backdoor technique is used to access to the secure data. Thus, when the condition occurs, a new instance of the current unique identifier may be created.

Then, the processor may generate a temporally sequential set of responses (such as 5, 10, 20, 50 or 100) and associated computation times (which each of the responses in the set of responses was computed or generated) based at least in part on the unique identifier and a challenge (such as an image, a QR code, another random number, another pseudorandom number, etc.). For example, a first response in the set of responses may be generated using a secure function or computation with the challenge as an input. Moreover, the first response may then be used as an input to the same or a second secure computation to produce a second response in the set of responses, which is then used in the subsequent secure computation (which may be the same as either or both of the first two secure computations or may be a different secure computation). Thus, a given subsequent response in the set of responses may generated using a given secure computation with a previous response in the set of responses as an input. Note that, for given hardware (such as a type of the electronic device, a version or model of the electronic device, a type of the processor, a version or model of the processor, a type of the memory, a version or model of the memory, etc.) and/or given software (such as a type of operating system or firmware, a version of the operating system or firmware, etc.), a time needed to generate the set of responses and the associated computation times may exceed a predefined value (such as a day, three days, a week, a month, etc.). In some embodiments, a given instance of a secure computation may include one or more iterations of a secure one-way hash (such as a type of SHA function) that is used to generate a nonce.

Furthermore, the processor may receive a request for the backdoor technique, e.g., from a user (such as law enforcement) via a user interface of the electronic device (such as a keyboard, a mouse, a haptic device, a touch-sensitive display, a voice-recognition interface, etc.). In response, the processor may instruct an interface circuit in the electronic device to provide one or more packets or frames to at least a second electronic device (or a group of instances of the second electronic device), where the one or more packets or frames may convey the current unique identifier and the challenge. Note that the second electronic device may be the same type and/or version or model as the electronic device (or may mimic the type and/or version or model of the electronic device).

In response to receiving the one or more packets or frames, at least the second electronic device may perform the secure computations to generate a temporally sequential second set of responses and associated second computation times. These computations may take a time of at least the predefined value to perform. For example, the secure computations performed by at least the second electronic device may be another instance of the secure computations performed by the electronic device. In some embodiments, as each of the set of secure computations is generated, an instance of the second electronic device used to compute it may be destroyed. Consequently, in these embodiments, a group of second electronic devices may be needed to generate the second set of responses and the associated second computation times.

Additionally, the interface circuit may receive one or more second packets or frames from at least the second electronic device, where the one or more second packets or frames may convey the second set of responses and the associated second computation times. In response, the interface may provide the set of responses and the associated second computation times to the processor.

Then, the processor may compare the set of responses and the associated computation times to the second set of responses and the associated second computation times. When the comparison achieves or meets a match criterion, the processor may allow access to the secure data. Otherwise, the electronic device may perform a remedial action. For example, the match criterion may specify allowed differences between the set of responses and the second set of responses, and between the computation times and the second computation times (such as 1, 5, or 10% for any individual comparison or for a cumulative error). Note that the remedial action may include denying access to the secure data or erasing the secure data.

In some embodiments, the processor may be configured to erase the secure data after a second predefined time interval (which may be the same or different from the predefined time value, such as 1, 3 or 7 days, and thus, in general, may be less than, equal to or greater than the predefined time value) has elapsed unless an authorized user activates the electronic device (such as when the authorized user provides a password or a biometric identifier) or the electronic device receives override information from a computer associated with a third party. For example, the override information may correspond to a court order that authorizes law enforcement or a governmental agency to use the backdoor technique. In this way, the electronic device may be set up to regularly erase the secure data if the authorized user does not routinely active the electronic device or if a court order does not override or disable this feature. The time interval for automatically erasing the secure data may be less than or equal to the predefined value, so that, in the absence of the override information, the secure data will be erased by the processor before an authorized party can complete the secure computations needed to generate the responses and the associated computation times.

Note that the memory and the processor may be included in a secure enclave in the electronic device.

In some embodiments, instead of at least the second electronic device generating the second set of responses and the associated second computation times in total before providing these results to the electronic device, at least the second electronic device may provide intermediate results (such as a given response in the second set of responses and the associated second computation time) to the electronic device. If these values meet the match criteria, the electronic device may provide a challenge that is used for the next iteration of the secure computations. Thus, in some embodiments, there is ongoing interaction between the electronic device and at least the second electronic device and multiple challenges are used as inputs in the secure computations (instead of using the output from a previous instance of the secure computation as an input into a current instance of the secure computation).

Figure 6:
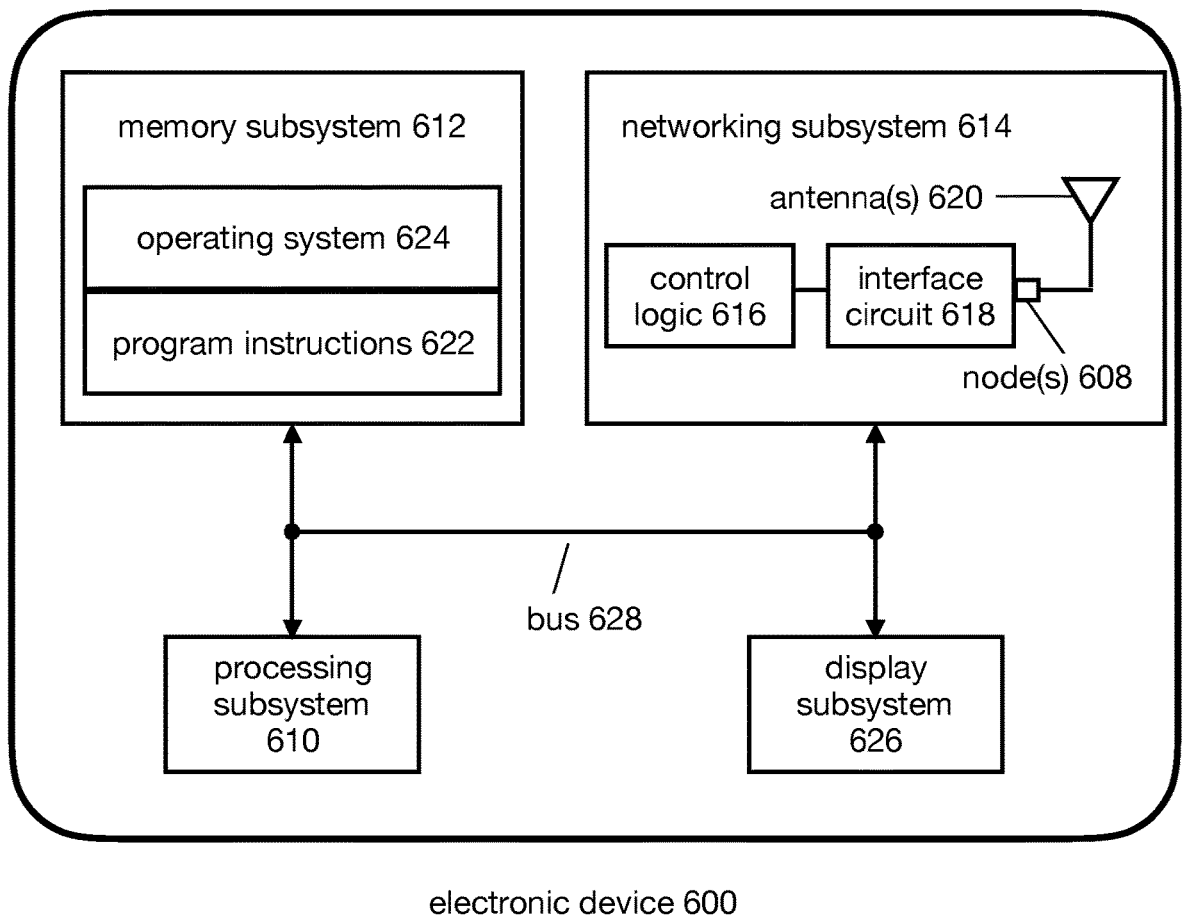
FIG. 6 shows a conceptual drawing of an example of electronic device.

FIG. 6 presents a block diagram illustrating an example of an electronic device 600 in accordance with some embodiments, such as one of the target device 100, the second device 150, the target device 300 or the second device 350.

This electronic device may include a processing subsystem 610, a memory subsystem 612, and a networking subsystem 614. The processing subsystem 610 may include one or more devices configured to perform computational operations. For example, the processing subsystem 610 can include one or more microprocessors, ASICs, microcontrollers, programmable-logic devices, one or more graphics process units (GPUs) and/or one or more digital signal processors (DSPs).

The memory subsystem 612 may include one or more devices for storing data and/or instructions for the processing subsystem 610 and the networking subsystem 614. For example, the memory subsystem 612 can include dynamic random access memory (DRAM), static random access memory (SRAM), and/or other types of memory. In some embodiments, instructions for the processing subsystem 610 in the memory subsystem 612 include: one or more program modules or sets of instructions (such as program instructions 622 or an operating system 624), which may be executed by the processing subsystem 610. Note that the one or more computer programs may constitute a computer-program mechanism. Moreover, instructions in the various modules in the memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by the processing subsystem 610.

In addition, the memory subsystem 612 can include mechanisms for controlling access to the memory. In some embodiments, the memory subsystem 612 includes a memory hierarchy that comprises one or more caches coupled to a memory in the electronic device 600. In some of these embodiments, one or more of the caches is located in the processing subsystem 610.

In some embodiments, the memory subsystem 612 is coupled to one or more high-capacity mass-storage devices (not shown). For example, the memory subsystem 612 can be coupled to a magnetic or optical drive, a solid-state drive, or another type of mass-storage device. In these embodiments, the memory subsystem 612 can be used by the electronic device 600 as fast-access storage for often-used data, while the mass-storage device is used to store less frequently used data.

The networking subsystem 614 may include one or more devices configured to couple to and communicate on a wired and/or wireless network (i.e., to perform network operations), including: a control logic 616, an interface circuit 618 and one or more antennas 620 (or antenna elements). (While FIG. 6 includes the one or more antennas 620, in some embodiments the electronic device 600 includes one or more nodes, such as a nodes 608, e.g., a network node that can be connected or coupled to a network, or a pad that can be coupled to the one or more antennas 620. Thus, the electronic device 600 may or may not include the one or more antennas 620.) For example, the networking subsystem 614 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

The networking subsystem 614 may include processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, the electronic device 600 may use the mechanisms in the networking subsystem 614 for performing simple wireless communication between the electronic devices, e.g., transmitting advertising or beacon frames and/or scanning for advertising frames transmitted by other electronic devices as described previously.

Within the electronic device 600, the processing subsystem 610, the memory subsystem 612, and the networking subsystem 614 are coupled together using a bus 628. The bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, the electronic device 600 includes a display subsystem 626 for displaying information on a display, which may include a display driver and the display, such as a liquid-crystal display, a multi-touch touchscreen, etc.

The electronic device 600 can be (or can be included in) any electronic device with at least one network interface. For example, the electronic device 600 can be (or can be included in): a desktop computer, a laptop computer, a subnotebook/netbook, a server, a tablet computer, a smartphone, a cellular telephone, a smartwatch, a consumer-electronic device, a portable computing device, a controller, test equipment, and/or another electronic device.

Although specific components are used to describe the electronic device 600, in alternative embodiments, different components and/or subsystems may be present in the electronic device 600. For example, the electronic device 600 may include one or more additional processing subsystems, memory subsystems, networking subsystems, and/or display subsystems. Additionally, one or more of the subsystems may not be present in the electronic device 600. Moreover, in some embodiments, the electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in the electronic device 600. For example, in some embodiments the program instructions 622 are included in the operating system 624 and/or the control logic 616 is included in the interface circuit 618. In some embodiments, the security technique is implemented using information in layer 2 and/or layer 3 of the Open System Interconnection model.

Moreover, the circuits and components in the electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of the networking subsystem 614 (or, more generally, of the electronic device 600). The integrated circuit may include hardware and/or software mechanisms that are used for transmitting wireless signals from the electronic device 600 and receiving signals at the electronic device 600 from other electronic devices. Aside from the mechanisms herein described, radios are generally known in the art and hence are not described in detail. In general, the networking subsystem 614 and/or the integrated circuit can include any number of radios. Note that the radios in multiple-radio embodiments function in a similar way to the described single-radio embodiments.

In some embodiments, the networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals.)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

The electronic device 600 may be used with a wide variety of communication protocols and, more generally, wired and/or wireless communication techniques. Thus, the described security technique may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the security technique may be implemented using the program instructions 622, the operating system 624 (such as a driver for the interface circuit 618) or in firmware in the interface circuit 618. Alternatively or additionally, at least some of the operations in the security technique may be implemented in a physical layer, such as hardware in the interface circuit 618.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the security technique, different numerical values may be used.

After reading this application, those skilled in the art would recognize that these definitions would be applicable to techniques, methods, physical elements, software elements, combinations or conjunctions of physical elements and software elements, and systems—currently known, or not currently known to be applicable by the techniques described herein—extensions thereof that would be inferred by those skilled in the art after reading this application, even if not obvious to those of ordinary skill in the art before reading this application.

The claims are incorporated into the specification as if fully set forth herein.

The invention claimed is:

1. An electronic device, comprising:
a network node; and
an interface circuit, coupled to the network node, configured to communicate with a second electronic device;
memory configured to store program instructions and secure data;
a processor, coupled to the memory, configured to execute the program instructions, wherein, when executed by the processor, the program instructions cause the electronic device to perform operations comprising:
creating a current unique identifier associated with the electronic device whenever a condition occurs, wherein the condition comprises one of: when the electronic device is powered on, when the electronic device is reset, when the electronic device is activated, or when a backdoor technique is used to access to the secure data;
generating a temporally sequential set of responses and associated computation times based at least in part on the unique identifier and a challenge, wherein a first response in the set of responses is generated using a secure computation with the challenge as an input, and wherein a given subsequent response in the set of responses is generated using a given secure computation with a previous response in the set of responses as an input, and wherein a time needed to generate the set of responses and the associated computation times exceeds a predefined value;
receiving a request for the backdoor technique;
providing, from the network node, one or more packets or frames intended for at least the second electronic device, wherein the one or more packets or frames convey the current unique identifier and the challenge;
receiving, at the network node, one or more second packets or frames associated with at least the second electronic device, wherein the one or more second packets or frames convey a second set of responses and associated second computation times;
comparing the set of responses and the associated computation times to the second set of responses and the associated second computation times;
when the comparison achieves a match criterion, allowing access to the secure data; and
otherwise, performing a remedial action.

2. The electronic device of claim 1, wherein the unique identifier or the challenge comprises a random number or a pseudorandom number.

3. The electronic device of claim 1, wherein the secure computation or the given secure computation comprises one or more iterations of a secure one-way function.

4. The electronic device of claim 1, wherein the match criterion specifies allowed differences between the set of responses and the second set of responses, and between the computation times and the second computation times.

5. The electronic device of claim 1, wherein the remedial action comprises denying access to the secure data or erasing the secure data.

6. The electronic device of claim 1, wherein the operations comprise erasing the secure data after a second predefined time interval has elapsed unless an authorized user activates the electronic device or the electronic device receives, at the network node, override information associated with a third party.

7. The electronic device of claim 6, wherein the override information corresponds to a court order.

8. The electronic device of claim 1, wherein the memory and the processor are included in a secure enclave in the electronic device.

9. A non-transitory computer-readable storage medium for use in conjunction with an electronic device, the computer-readable storage medium storing program instructions that, when executed by a processor in the electronic device, causes the electronic device to perform operations comprising:
creating a current unique identifier associated with the electronic device whenever a condition occurs, wherein the condition comprises one of: when the electronic device is powered on, when the electronic device is reset, when the electronic device is activated, or when a backdoor technique is used to access to secure data stored in memory in the electronic device;
generating a temporally sequential set of responses and associated computation times based at least in part on the unique identifier and a challenge, wherein a first response in the set of responses is generated using a secure computation with the challenge as an input, and wherein a given subsequent response in the set of responses is generated using a given secure computation with a previous response in the set of responses as an input, and wherein a time needed to generate the set of responses and the associated computation times exceeds a predefined value;
receiving a request for the backdoor technique;
providing one or more packets or frames intended for at least the second electronic device, wherein the one or more packets or frames convey the current unique identifier and the challenge;
receiving one or more second packets or frames associated with at least the second electronic device, wherein the one or more second packets or frames convey a second set of responses and associated second computation times;
comparing the set of responses and the associated computation times to the second set of responses and the associated second computation times;
when the comparison achieves a match criterion, allowing access to the secure data; and
otherwise, performing a remedial action.

10. The non-transitory computer-readable storage medium of claim 9, wherein the unique identifier or the challenge comprises a random number or a pseudorandom number.

11. The non-transitory computer-readable storage medium of claim 9, wherein the secure computation or the given secure computation comprises one or more iterations of a secure one-way hash.

12. The non-transitory computer-readable storage medium of claim 9, wherein the match criterion specifies allowed differences between the set of responses and the second set of responses, and between the computation times and the second computation times.

13. The non-transitory computer-readable storage medium of claim 9, wherein the remedial action comprises denying access to the secure data or erasing the secure data.

14. The non-transitory computer-readable storage medium of claim 9, wherein the operations comprise erasing the secure data after a second predefined time interval has elapsed unless an authorized user activates the electronic device or the electronic device receives, at the network node, override information associated with a third party.

15. The non-transitory computer-readable storage medium of claim 14, wherein the override information corresponds to a court order.

16. The non-transitory computer-readable storage medium of claim 9, wherein the memory and the processor are included in a secure enclave in the electronic device.

17. A method for selectively allowing access to secure data, comprising:
by a processor in an electronic device:
creating a current unique identifier associated with the electronic device whenever a condition occurs, wherein the condition comprises one of: when the electronic device is powered on, when the electronic device is reset, when the electronic device is activated, or when a backdoor technique is used to access to secure data stored in memory in the electronic device;
generating a temporally sequential set of responses and associated computation times based at least in part on the unique identifier and a challenge, wherein a first response in the set of responses is generated using a secure computation with the challenge as an input, and wherein a given subsequent response in the set of responses is generated using a given secure computation with a previous response in the set of responses as an input, and wherein a time needed to generate the set of responses and the associated computation times exceeds a predefined value;
receiving a request for the backdoor technique;
providing one or more packets or frames intended for at least the second electronic device, wherein the one or more packets or frames convey the current unique identifier and the challenge;
receiving one or more second packets or frames associated with at least the second electronic device, wherein the one or more second packets or frames convey a second set of responses and associated second computation times;
comparing the set of responses and the associated computation times to the second set of responses and the associated second computation times;
when the comparison achieves a match criterion, allowing access to the secure data; and
otherwise, performing a remedial action.

18. The method of claim 17, wherein the remedial action comprises denying access to the secure data or erasing the secure data.

19. The method of claim 17, wherein the method comprises erasing the secure data after a second predefined time interval has elapsed unless an authorized user activates the electronic device or the electronic device receives, at the network node, override information associated with a third party.

20. The method of claim 17, wherein the memory and the processor are included in a secure enclave in the electronic device.

\* \* \* \* \*